Figure 1:
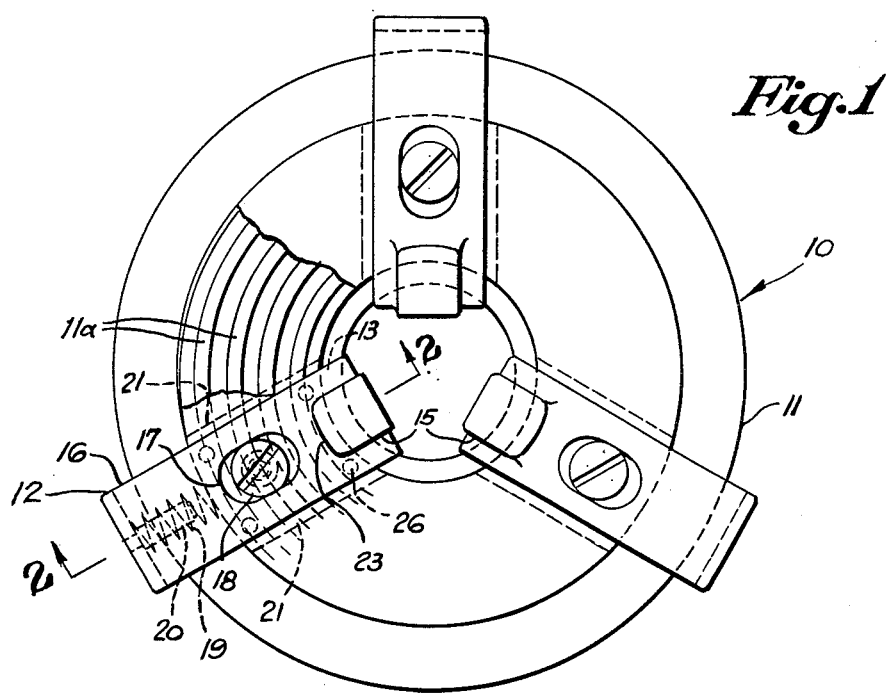

Feb. 6, 1962 M. FELDMAN 3,020,058
AUTOMATICALLY ADJUSTING HOLDING DEVICE
Filed Jan. 4, 1960

INVENTOR.
MILTON FELDMAN
BY Richards & Heier
ATTORNEYS

United States Patent Office 3,020,058
Patented Feb. 6, 1962

3,020,058
AUTOMATICALLY ADJUSTING
HOLDING DEVICE
Milton Feldman, 34 Harvard Road, Linden, N.J.
Filed Jan. 4, 1960, Ser. No. 431
1 Claim. (Cl. 279—123)

This invention relates to a holding device, and refers, more particularly, to an automatically adjusting holding device.

In prior art holding devices for polishing, the device would grip the workpiece at an initial pressure. However, when the workpiece was polished or other work done thereon, the workpiece would suffer a rise in temperature and this rise in temperature would cause an increase in the dimensions of the workpiece. If the pressure or holding device had an external grip on the workpiece when the workpiece became expanded, the pressure on the workpiece would be greatly increased, often causing irreparable damage. If the pressure or holding device had an internal grip on the workpiece (such as on the inside of a coffee pot) the increased temperature would cause the inside dimension of the workpiece to increase, thus causing the holding device to lose its firm grip on the workpiece. The workpiece can then become dislodged from its proper position in the holding device and damage or improper working would result. Likewise, in prior art devices damage can result when under certain conditions there is a decrease in workpiece temperature.

An object of the present invention is the provision of a holding device not having the disadvantages of prior art.

Another object is the provision of an automatically adjusting holding device.

Another object is the provision of an automatically adjusting holding device which will adjust itself to suit the dimensional changes of the work-piece due to temperature variation or other causes.

Another object is the provision of an automatically adjusting holding device wherein the grip and pressure on the workpiece is constant regardless of dimensional changes in the workpiece during the working operation.

A further object is the provision of an automatically adjusting holding device having a plurality of jaws, each jaw being independently self-adjusting to compensate for peculiar dimensional variations of the workpiece.

A further object is the provision of a holding device to hold objects of peculiar and various shapes.

Still a further object is the provision of an automatically adjusting holding device which is easy and inexpensive to manufacture and which is easily utilized.

Other objects of the present invention will become apparent in the course of the following specification.

The objects of the present invention may be realized through the provision of a holding device with automatically adjusting holding portions. This is accomplished by having each holding element independently mounted. Each holding element is connected to the support in such a manner that it will grip the workpiece so that when the workpiece expands or contracts the holding element will undergo movement due to the increase or decrease of the pressure on the workpiece. The movement is accomplished through the use of an elastic compressive means together with further connecting means which allows a small amount of movement due to the change in pressure on the holding elements.

The invention will appear more clearly from the following detailed description when taken in connection with the accompanying drawing showing, by way of example, preferred embodiments of the inventive idea.

Figure 2:
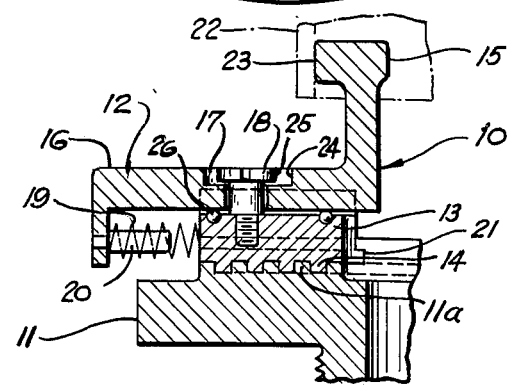
Figure 3:
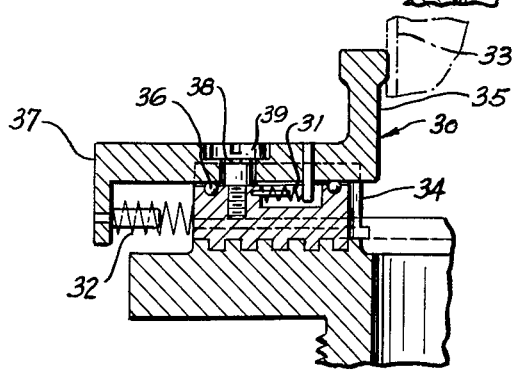

In the drawing:
FIGURE 1 is a top view of the automatically adjusting holding device of the present invention.
FIGURE 2 is a partial sectional view along line 2—2 of FIGURE 1; and
FIGURE 3 is a side view partially in section of another embodiment of the automatically adjusting holding device of the present invention.

The automatically adjusting holding device 10 of the present invention is shown in FIGS. 1 and 2 and comprises a support 11 having a spiral groove thread 11a, and holding portion 12. Each holding portion 12 comprises a base portion 13 having threads 14 on its lower surface engaged in the spiral groove 11a', a holding element 15 (such as a chuck jaw), having a horizontally disposed flange 16 (or separate plate connected to the holding element) having an elongated slot 17 for receiving a shoulder bolt 18, and an elastic compressive element such as the spring 19 which is rigidly connected to the flange 16 and is supported by the member 20. The shoulder bolt 18 is securely engaged in the base portion 13 and passes through the elongated slot 17 of flange 16. The bolt 18 is free to move in slot 17 in a direction passing through the center point of the support 11, and in the case of a round support this is a radial direction.

Each of the base portions 13 are independently mounted on the support 11, and support shoulders 21 prevent the base portions 13 from moving in any direction except the direction passing through the center of the support 11 or holding device 10. The base is elongated in this direction and its threads 14 are normal to its longitudinal axis and are so designed with respect to the spiral groove 11a' that there is no slack between the groove 11a' and the threads 14. A lathe-feed type mechanism may be utilized to independently move the holding portion 12 instead of the groove device. The base portion 13 is connected to the flange 16 and holding element 15 only by means of the spring 19 and shoulder bolt 18.

The manner of use and operation of the automatically adjusting holding device 10 of the present invention is as follows:

The base portion 13 is placed on the support 11 with the threads 14 of the base portion 13 engaging the spiral groove 11a' of support 11. If the support 11 is then rotated the base portions 13 will move radially inward, since they cannot move laterally due to the support shoulders 21. Thus, the base portions 13 and, consequently, the holding elements 15 are adjustable radially until contact is made with the workpiece 22. Since each base portion 13 is independent of the others, it may be disengaged from the spiral groove thread 11a and moved closer to or further away from the center of the holding device 10 in order to compensate for irregularly shaped workpieces.

If the workpiece 22 is an item such as a coffee pot, the holding elements 15 may make contact with the workpiece 22 internally as shown in FIG. 2. Thus the support would be rotated until the diameter of the contact surface 23 of the holding elements 15 is smaller than the internal diameter of the coffee pot workpiece 22. At this time the holding element 15 will be free from the workpiece, the elastic spring 19 will still be in compression, but will be tending to decrease its compression and, consequently, the holding element 15 will tend to move in an outward radial direction. Thus surface 24 of the holding element 15 will come in contact with surface 25 of the shoulder bolt 18. The base portion 13 is moved outwardly with respect to the workpiece 22 until the holding element 15 contacts the interior surfaces of the workpiece 22. At this time the further outward radial movement of the base portion 13 will cause compression in the spring 19. Further movement of the base 13 moves the shoulder bolt 18 in an outward radial direction, thus causing surface 25 of shoulder bolt 18 to break contact with surface 24 of holding element 15. The radial relationship of the base 13 to flange 16 is maintained by means of compression of spring 19, and the shoulder bolt 18 is free and not in contact with the flange 16 of holding element 15. The workpiece 22 is now securely held in holding device 10 and the polishing operation or other working operation may be undertaken. Of course, the entire support 11 and holding device 10 may be rotated as a unit for convenience in polishing or other working operations.

As the workpiece 22 heats up it will expand and the internal temperature will increase. In prior art holding devices such an increase in temperature would cause the workpiece 22 to become loose in the holding elements 15, whereby damage to the workpiece or injury to the workers might result. In the present invention, as the workpiece 22 heats up and expands, the spring 19 which is in compression will tend to move the flange 16 and holding element 15 in an outward radial direction, so that a constant grip and pressure is maintained by the holding element 15 on the workpiece 22. This is clearly seen when it is realized that the base portion 13 cannot move radially with regard to the support 11 unless the support 11 is rotated and/or other means is employed to move the base 13. Therefore, the decreased compression and consequent expansion of the spring 19 will tend to cause the flange 16 to move outward, and since the flange 16 is free of lateral contact with the shoulder bolt 18, it may do so carrying with it the holding element 15. Thus the holding element 15 never loses its constant grip and pressure contact against the workpiece 22. The flange 16 is free to move outward until contact is again made between surfaces 24 and 25, but this contact is unlikely since the movement caused by temperature will be relatively small with respect to the compressive contraction placed in the spring 19 which originally broke the contact of surfaces 24 and 25. Bearings 26 between flange 16 and base 13 allow for a smooth movement therebetween. Should the internal diameter of the workpiece 22 decrease, the inward pressure on the holding element 15 will recompress the spring 19, allowing the holding element 15 to move inwardly so that no injury will be caused to the workpiece 22. Of course, the present invention may be utilized to hold the workpiece internally or externally and also to compensate for an expansion or contraction of the workpiece 22.

Another embodiment 30 of the present invention is shown in FIG. 3 and is similar to the device shown in FIG. 2 except that it includes an additional spring 31. By disconnecting spring 31 and utilizing spring 32, the device of FIG. 3 may be used precisely as the device of FIG. 2. By disconnecting spring 32 and utilizing spring 31 the embodiment 30 may be used to externally grip the workpiece 33. The operation is similar to that described above and is as follows:

The base 34 is movable inwardly until the holding element 35 makes contact with the workpiece 33. Further inward movement of base 34 causes compression in spring 31 and also causes the workpiece 33 to be firmly gripped. The compression in spring 31 maintains the holding element 35 in a position in contact with workpiece 33, whereby a constant grip and pressure is maintained. Bearing 36, flange 37, bolt 38 and slot 39 are shown.

Among the advantages of the automatically adjusting holding device of the present invention are the following: The device may be used to grip any size or irregularly shaped workpiece; the device maintains a constant pressure and grip on the workpiece regardless of any dimensional changes in the workpiece during the working operation; each holding element of the device is independently mounted and will independently compensate for any irregular dimensional change in the workpiece; the device is automatically adjusting, and once the workpiece has been gripped no further adjustment need be made due to any dimensional changes in the workpiece; and the device of the present invention is easy and inexpensive to manufacture and saves a great deal of time and effort in use.

It is apparent that the described examples are capable of many variations and modifications within the scope of the present invention. All such variations and modifications are to be included within the scope of the present invention.

What is claimed is:

A holding device comprising in combination with a support having a centrally located spiral groove thread, a plurality of holding portions, each of said holding portions comprising a base portion having a plurality of grooves in one face, said base portion being independently mounted on said support and movable thereon in a direction passing substantially through the center of said support, said grooves in said base portion engaging said spiral groove thread, a holding element, a spring under compression connecting said holding element to said base portion, said spring tending to slidably move said holding element on said base portion in a direction parallel to said base portion and decrease the compression in said spring, and a shoulder bolt, said holding element having an opening elongated in a direction parallel to the movement of said spring for admitting said shoulder bolt, said shoulder bolt disposed in said elongated opening and connected to said base portion, whereby said holding element may move relative to said base portion in a direction parallel to the movement of said spring.

References Cited in the file of this patent
UNITED STATES PATENTS

| | | |
|---|---|---|
| 1,799,019 | Mischler | Mar. 31, 1931 |
| 2,158,490 | Webster | May 16, 1939 |